(12) United States Patent
Edelson

(10) Patent No.: US 7,852,037 B2
(45) Date of Patent: Dec. 14, 2010

(54) INDUCTION AND SWITCHED RELUCTANCE MOTOR

(75) Inventor: Jonathan Sidney Edelson, Portland, OR (US)

(73) Assignee: Borealis Technical Limited, London (GB)

( * ) Notice: Subject to any disclaimer, the term of this patent is extended or adjusted under 35 U.S.C. 154(b) by 165 days.

(21) Appl. No.: 11/918,914

(22) PCT Filed: Apr. 5, 2006

(86) PCT No.: PCT/US2006/012483

§ 371 (c)(1),
(2), (4) Date: Feb. 17, 2009

(87) PCT Pub. No.: WO2006/113121

PCT Pub. Date: Oct. 26, 2006

(65) Prior Publication Data

US 2009/0302787 A1  Dec. 10, 2009

Related U.S. Application Data

(60) Provisional application No. 60/673,021, filed on Apr. 19, 2005.

(51) Int. Cl.
*H02P 25/00* (2006.01)

(52) U.S. Cl. ............... 318/701; 318/254.1; 318/400.23; 318/400.25; 318/705; 318/715; 318/713; 310/166; 310/168

(58) Field of Classification Search ................ 318/701, 318/254.1, 400.23, 400.25, 705, 715, 713; 310/166, 168

See application file for complete search history.

(56) References Cited

U.S. PATENT DOCUMENTS

| 382,279 | A | | 5/1888 | Tesla |
|---|---|---|---|---|
| 3,808,481 | A | | 4/1974 | Rippel |
| 3,821,619 | A | | 6/1974 | Hoffman |
| 3,930,190 | A | | 12/1975 | Liska |
| 3,931,553 | A | | 1/1976 | Stich et al. |
| 4,292,575 | A | | 9/1981 | Kuhnlein et al. |
| 4,484,115 | A | | 11/1984 | Takahashi |
| 4,607,204 | A | | 8/1986 | Setoya |
| 4,611,157 | A | | 9/1986 | Miller et al. |
| 4,698,537 | A | * | 10/1987 | Byrne et al. ................ 310/168 |
| 4,713,594 | A | | 12/1987 | Bose et al. |
| 4,730,150 | A | | 3/1988 | Lee et al. |
| 4,736,147 | A | * | 4/1988 | Shizhang .................... 318/778 |
| 4,751,448 | A | | 6/1988 | Auinger |
| 4,755,732 | A | | 7/1988 | Ando |
| 4,900,965 | A | | 2/1990 | Fisher |

(Continued)

FOREIGN PATENT DOCUMENTS

DE            20/03639 A      8/1971

(Continued)

*Primary Examiner*—Rita Leykin

(57) ABSTRACT

This application describes a motor designed to operate as a reluctance machine at low speeds and as an induction machine at high speeds. The drive waveform is composed of one or more harmonics to be used to match the reluctance pattern of the stator-rotor, causing the rotor to rotate due to the reluctance effect, and one or more other harmonics to induce current in the rotor, causing the rotor to rotate due to the induction effect and the subsequent interaction of the stator and rotor magnetic fields. The two effects are generally not applied simultaneously.

27 Claims, 4 Drawing Sheets

U.S. PATENT DOCUMENTS

| | | | |
|---|---|---|---|
| 5,053,689 A * | 10/1991 | Woodson et al. | 318/705 |
| 5,068,587 A | 11/1991 | Nakamura et al. | |
| 5,075,610 A | 12/1991 | Harris | |
| 5,449,962 A | 9/1995 | Shichijyo et al. | |
| 5,488,280 A | 1/1996 | Langreck | |
| 5,614,799 A | 3/1997 | Anderson et al. | |
| 5,686,770 A | 11/1997 | Naito | |
| 5,703,457 A | 12/1997 | Davis | |
| 5,977,679 A * | 11/1999 | Miller et al. | 310/164 |
| 6,054,837 A | 4/2000 | Edelson | |
| 6,064,172 A | 5/2000 | Kuznetsov | |
| 6,101,109 A * | 8/2000 | Duba et al. | 363/71 |
| 6,153,953 A | 11/2000 | Isozaki et al. | |
| 6,175,272 B1 | 1/2001 | Takita | |
| 6,373,160 B1 | 4/2002 | Schrodl | |
| 6,657,334 B1 | 12/2003 | Edelson | |
| 6,768,279 B1 | 7/2004 | Skinner et al. | |
| 6,812,661 B2 | 11/2004 | Maslov | |
| 6,831,430 B2 | 12/2004 | Edelson | |
| 6,838,791 B2 | 1/2005 | Edelson | |
| 6,892,439 B1 | 5/2005 | Neal et al. | |
| 6,922,037 B2 | 7/2005 | Edelson | |
| 7,116,019 B2 | 10/2006 | Edelson | |
| 2002/0041168 A1 | 4/2002 | Mann et al. | |
| 2003/0173931 A1 * | 9/2003 | Edelson | 318/801 |
| 2004/0090196 A1 * | 5/2004 | Maslov et al. | 318/272 |
| 2007/0024147 A1 * | 2/2007 | Hirzel | 310/191 |

FOREIGN PATENT DOCUMENTS

| | | |
|---|---|---|
| WO | WO 00/51229 A | 8/2000 |
| WO | WO 2006/002207 A2 | 1/2006 |
| WO | WO 2006/065988 A2 | 6/2006 |

* cited by examiner

INDUCTION AND SWITCHED RELUCTANCE MOTOR

CROSS-REFERENCE TO RELATED APPLICATIONS

This application is the U.S. national stage application of International Application No. PCT/US2006/012483, filed Apr. 5, 2006, which international application was published on Oct. 26, 2006, as International Publication WO/2006/113121 in the English language. The International Application claims the benefit of U.S. Provisional Patent Application No. 60/673,021, filed Apr. 19, 2005. This application also claims the benefit of U.S. patent application Ser. No. 11/792,967, filed Jun. 13, 2007. U.S. patent application Ser. No. 11/792,967 is the U.S. national stage application of International Application No. PCT/US2005/045409, filed Dec. 13, 2005, which international application was published on Jun. 22, 2006, as International Publication WO/2006/065988 in the English language. The International Application claims the benefit of U.S. Provisional Patent Application No. 60/635,767, filed Dec. 13, 2004, and U.S. Provisional Patent Application No. 60/737,587, filed Nov. 16, 2005. This application is also a Continuation-in-Part of U.S. patent application Ser. No. 11/630,293, filed Dec. 19, 2006, which is the U.S. national stage application of International Application No. PCT/US2005/022011, filed Jun. 21, 2005, which international application was published on Jan. 5, 2006, as International Publication WO2006/002207 in the English language. The International Application claims the benefit of Provisional Patent Application No. 60/581,789, filed Jun. 21, 2004 and is a Continuation-in-Part of U.S. patent application Ser. No. 11/029,978, filed Jan. 4, 2005, which is a Divisional of U.S. patent application Ser. No. 10/132,936 filed Apr. 26, 2002, and which claims the benefit of U.S. Provisional App. No. 60/286,862 filed Apr. 26, 2001. U.S. patent application Ser. No. 10/132,936 is a Continuation-in-part of U.S. patent application Ser. No. 09/713,654, filed Nov. 15, 2000.

The above-mentioned patent applications are assigned to the assignee of the present application and are herein incorporated in their entirety by reference.

TECHNICAL FIELD

This invention relates to a combination reluctance and high phase order induction machine.

BACKGROUND ART

Terms Used in this Specification

SR stands for Switched Reluctance Machines

HS stands for Hybrid Stepping Stepper Machines

VR stands for Variable Reluctance Machines

P is the number of poles of the magnetic field

N is the number of different electrical phases per pole in an AC induction motor H is the harmonic order of the drive waveform M is the number of poles of a base magnetic field wound in a stator L is the span of a mesh connection of stator windings V/Hz is the volts/Hertz ratio D is rotational degrees, or rotational degrees per pole, measured on a stator R is the number of regions of low reluctance ST are stator teeth RT are rotor teeth X represents the stator tooth count Y represents the rotor tooth count B is the magnetic flux density $\Phi$ is the total flux A is the cross-sectional area of the magnetic circuit.

E is the electromotive force i is the current r is the resistance of a circuit.

T is the reluctance of a magnetic circuit and is analogous to resistance in the electric circuit.

$\mu$ symbolizes the permeability of a medium forming the magnetic circuit.

Background—Reluctance Machines

Various forms of Reluctance motors exist in the art, based on the principle of 'Reluctance Torque', described as follows. When a bar of iron or steel is suspended so that it is free to rotate in a magnetic field, the bar will attempt to align itself with the field, so as to produce the minimum reluctance path for the magnetic field. If the direction of the field is changed, the bar will attempt to turn until it is again aligned, by the action of the so-called reluctance torque. Reluctance torque is very strong for ferromagnetic materials, very weak for paramagnetic materials, and a diamagnetic bar will weakly align to be perpendicular to the magnetic field.

Variable Reluctance (VR) stepper motors use the reluctance principle, and magnetic fields are produced solely by sets of stationary current-carrying windings. Hybrid Stepping (HS) stepper motors also have sets of windings, but the rotor is formed of two sets of teeth separated by one another by a permanent magnet, so that one set of teeth is maintained at a North polarity, and the other set of teeth is maintained at a South polarity. A tooth in one set of rotor teeth is aligned with a slot in the other set of rotor teeth. These motors also utilize the reluctance torque.

Reluctance Motors are a form of synchronous motors, the rotor consists of a set of laminations shaped so that it tends to align itself with the field produced by the stator. These machines differ from the stepper motors in that they only have saliency (projections) on the rotor, the stator being identical with that of a 3-phase induction motor. In fact, since induction motor action is required in order to get the rotor up to synchronous speed, a practical reluctance-type rotor does have more than just a shaped rotor and in practice it resembles a cage induction motor. However, parts of the periphery are cut away in order to force the flux from the stator to enter the rotor in the remaining regions where the air-gap is small. Alternatively, the 'preferred flux paths' can be imposed by removing iron inside the rotor so that the flux is guided along the desired path. The rotor tends to align itself with the magnetic field and hence is able to remain synchronized with the rotating field set up by the 3-phase winding on the stator in much the same way as a permanent magnet (PM) rotor. Various systems for open and closed loop drive control exist.

A Switched Reluctance (SR) motor is built with salient poles on both the rotor and stator. The stator caries coils on each pole or projection and the coils on opposite poles are usually connected in series. The rotor, which is made from laminations in the usual way, has no windings or magnets and is cheap and robust. A range of arrangements are possible, a common one consists of eight stator poles and six rotor poles. The eight stator poles are grouped to form four phases, which are independently energized from a 4-phase converter. At low speeds, chopping action is used to maintain a rectangular current waveform, but before reaching base speed, control enters the single-pulse mode in which full voltage is applied throughout the 'on' period of each phase. It is very similar to the VR stepper motor, but is different in that the SR motor has continuous operation, and also that the SR motor is designed for self-synchronous operation, the phases being switched by signals derived from a shaft-mounted rotor position detector. It is not necessary to provide both positive and negative currents in the phases.

The SR motor drive sequentially switches the currents on and off, thus ensuring that projections on the rotor are continually chasing the current. In a common example, depicted in FIG. 1, a stator 1 is wound with windings 3 which are supplied with phases of electrical power. Rotor 2 has no magnets or windings of any kind and is effectively a piece of shaped iron. In this example, rotor 2 consists of eight iron projections (poles) arranged at angles of 45 degrees. Stator 1 is configured with twelve projections 30 degrees apart from one another, each with a current-carrying coil, wound in series across four projections 90 degrees apart, to form three "stator pole sets", or "phases" (A, B, C). Current applied to phase A through the motor winding causes a magnetic attraction that aligns four of the rotor teeth with the four stator poles A. Energizing stator pole B causes the rotor to rotate 15 degrees counterclockwise as the other rotor teeth are pulled into alignment with stator poles B. This process will continue with phase C and back to A, each time the nearest set of four teeth being pulled into alignment with the four energized stator poles. Reversing the procedure (C to A) would result in a clockwise rotor rotation. The torque is dependent on the magnitude of the coil currents but is independent of its polarity.

Rotor-mounted position sensors are sometimes seen as a liability. Not only do they introduce cost to the motor, but they can also be a major source of poor performance and unreliability. Work world-wide has now produced a number of viable schemes for sensor-less operation. They all require monitoring of the phase current and applied voltage (flux observation), then by using knowledge of the magnetic characteristics, the rotor position is determined. This information is then used to optimize performance.

There are several other configurations for reluctance motors. In one form, the rotor consists of an iron ring with radial slots through it. A rotor is composed of a plurality of sectors, or arcs. The magnetic flux travels circumferentially around the arc of this rotor ring, completing the magnetic flux path between adjacent stator projections.

Background—Induction Machines and High Phase Order Induction Machines

An AC induction motor is a rotating electric machine designed to operate from an N phase source of alternating voltage. N is typically three, or greater. For a three phase machine, the stator is a classic three phase stator with the windings displaced by 120°. The most common type of induction motor has a squirrel cage rotor in which aluminum conductors or bars are shorted together at both ends of the rotor by cast aluminum end rings. Another type of rotor is a wound rotor. The rotor itself generally has a smooth cylindrical shape, specifically to reduce cogging torque. When three currents flow through the three symmetrically placed windings, a sinusoidally distributed air gap flux (stator magnetic field) generating the rotor current is produced. The interaction of the sinusoidally distributed air gap flux and induced rotor currents produces a torque on the rotor.

In adjustable speed applications, AC induction motors are powered by inverters. The inverter converts DC power to AC power at the required frequency and amplitude. The inverter typically consists of N half-bridge units where the upper and lower switches are controlled complimentarily. The output voltage is mostly created by a pulse width modulation (PWM) technique. The N-phase voltage waves are shifted by 360°/N to each other and thus an N phase motor can be supplied.

a) High Phase Order Machines

In U.S. Pat. Nos. 6,657,334 and 6,831,430, a high phase order induction machine drive system is disclosed. This has an inverter system for the synthesis of a plurality of phases of alternating current output, and an N-phase induction motor (N is greater than 3).

b) Winding Configurations

A common drive configuration for an induction machine is for each stator winding phase to be aligned in a first direction for a phase in an odd numbered pole, and in the reverse direction for the even numbered poles. An inverter output phase supplies drive to like phases in each of the poles.

Assuming that there are N winding phases per pole and the inverter supplies N different phases, a cross section of the stator will yield N different phase angles in each of the poles concurrently.

However, in an alternative embodiment, each winding phase of each pole is separately wound on the stator, and the windings do not cross the stator end, but rather are wrapped around the outside of the stator. This is known as a toroidal winding, and is described in greater detail in WO2006/ 065988. Winding phases for a toroidal configuration may be connected together, in various ways. For example, every like phase in the odd numbered poles may be driven simultaneously, and every like phase in the even numbered poles may be driven simultaneously. In another example, every like phase in every pole may be connected together, with the phases in the odd numbered poles connected in the reverse direction to the phases in the even numbered poles. Alternatively, each winding phase in each pole may be separately driven by a dedicated inverter output phase.

c) Terminology

To prevent confusion, "N phases" in the current disclosure refers to N different phases per pole, or per 180 electrical degrees with fundamental operation. The term "winding phase" is used to mean a stator winding that is supplied with a phase of electrical current. A "winding phase" may include one or more repeated or inverted windings in different poles, if these are connected together. A "winding phase" may further include distributed windings within the same stator pole.

The minimum number of phases required by the present invention is more than three different phases per pole, and the term "N phases, where N is more than three" implies that there are more than three different winding phases per pole, irrespective of how many of these have dedicated drive.

d) Harmonics

Harmonics of the drive waves are generally considered to produce undesirable torques. This is because harmonics tend to produce a stator magnetic field that aliases to a lower number of poles than the phase count, and rotates at a different speed to the fundamental rotating magnetic field. In contrast, when the number of different phases per pole in the machine is higher than the harmonic order, the harmonics produce a rotating magnetic field with a number of poles equal to double the harmonic order. This magnetic field rotates at the same speed as the rotating magnetic field produced by the fundamental. Therefore, harmonics of an order up to the phase count produce beneficial torque. This includes harmonics that are present by accident or design.

Harmonics can be used as the drive waveform for the machine, in place of or together with the fundamental. All harmonics of an order below the phase count per pole can be used. Operation with different harmonics produces different magnetic field configurations, or "pole counts". For example, for a two pole machine, the fundamental, H=1 produces a two pole field, second harmonic, H=2, produces a four pole field, third harmonic, H=3, produces a six pole field, etc.

e) Harmonics Above the Phase Count

Harmonics of an order above the phase count usually produce a non-beneficial torque in an induction machine, when used in combination with the fundamental, since they oppose the fundamental's magnetic field motion. For example, in a two pole, three phase machine, the fifth harmonic produces a 2-pole magnetic field that rotates at the same speed but in the reverse direction to the magnetic field produced by fundamental. In the same machine, seventh harmonic produces a 2-pole magnetic field that rotates in the same direction as the magnetic field produced by the fundamental, but much faster. If used in isolation, these harmonics above the phase count can provide drive and will produce a magnetic field with an aliased number of poles. Harmonics that are multiples of the phase count do not produce rotating magnetic fields.

f) Base Magnetic Field

An induction machine stator is wound with a base magnetic field of two or more poles. A base magnetic field (M) is the number of magnetic poles that would be developed by the wound stator if supplied with fundamental drive waveform—$1^{st}$ harmonic. If a stator is wound with a base magnetic field of two, (M=2), the fundamental drive waveform will produce a two pole rotating field. However, if a harmonic is used as the drive waveform instead of the fundamental, the pole count of the magnetic field produced will be equal to H*M, where H is the harmonic order, and M is the base magnetic field. This assumes that the harmonic order is less than the phase count, or else the harmonic tends to alias, as mentioned above.

The "stator magnetic field" in this disclosure refers to the actual magnetic field developed in the stator, taking into account the base magnetic field and the order of the harmonic supplied to the coils. The stator magnetic field, though developed by the stator windings, extends beyond the stator into the airgap and rotor region. It is also known as the rotating magnetic field, or the airgap flux.

g) Mesh and Star Connections

It should be noted that for a high phase order machine, where N is more than three, the windings may each be driven with a full bridge inverter connection. An alternative configuration is with inverter half bridges, and the windings are connected to the inverter drive with a star or a mesh connection. For a star connection, each motor phase is connected to one inverter terminal and to a common point, preferably of zero voltage relative to earth. For a mesh connection, the motor is connected to the inverter terminals so that each motor phase is electrically connected to a first inverter terminal and to a second inverter terminal that is L inverter terminals distant from the first inverter terminal, in order of electrical phase angle (L in the span number). The phase angle difference between the pair of inverter terminals to which each motor phase is connected is identical for each motor phase.

When a mesh connected machine is driven with drive waveform of different harmonic orders, the V/Hz ratio and the impedance of the machine varies in accordance with the harmonic order. The V/Hz ratio and the impedance also depend upon the number of phases and the span of the mesh connection. The harmonic mesh effect is described in greater detail in U.S. Pat. No. 6,657,334.

h) Even Order Harmonics

Even order harmonics of an order less than the phase count also produce beneficial torque in the motor. However, even order harmonics cannot be used if the machine has winding phases that are wound across adjacent poles with a full pitch, since the symmetry of the winding prevents a four pole magnetic field from being set up on the stator. Ways to use even order harmonics in a machine include winding the stator winding phases with a short pitch, or by providing each stator winding phase with a dedicated inverter drive phase for phases of stator poles of opposite polarity.

i) Short Pitch Windings

The stator may be wound with a full pitch winding, or a short pitch. If it is desired to use even order harmonics as the drive waveform, a short pitch winding is one way to do so. The short pitch is usually done by providing an equal number of winding phases to slots, and placing two windings in each slot—the drive side of one winding and the back side of another winding.

The phase angle for the total windings of each slot is a combination of the phase angles of the two windings in the slot. The pitch of the stator winding is chosen to allow the harmonics that it is desired to use. For example, if it is desired to both the first harmonic and second harmonic, a pitch of 120 D may be used. This prohibits third harmonic operation, so if it were desired to use second and third harmonic, and pitch of 150 D may be used. Further details of the short pitch windings are in WO 2006/002207.

j) Toroidal Windings

A benefit of the toroidal wrapped winding described above is that it reduces end turn length of the stator winding. An additional benefit arises particularly in conjunction with large machines, which are to be driven with a higher pole count than two, and for which it is desired to take advantage of the harmonic mesh effect varying the impedance of the machine. Since end turns do not need to cross the stator, even large machines may be wound with a base pole count of two. The benefit of a large machine wound with M=2 is that the machine may be operated with a close choice of harmonic orders. This enables the benefits of the above mentioned variability in machine impedance according to the harmonic order applied, while allowing the pole count to remain close to a certain value. For example, a machine may be wound with M=2, and be operated with a choice of fifth and sixth harmonic, producing ten and twelve pole fields respectively. If the machine had been wound with a higher base pole count, for example, M=6, the lowest variation in harmonic orders, H=1, and H=2, would produce pole fields greatly differing in pole count, namely six and twelve poles.

All motors have an operational envelope containing characteristics over there speed range. Currently, induction motors work best at high speeds and are less efficient at low speeds, because of an undesirable cogging torque produced.

In contrast, switched reluctance machines are good torque producers over a range of speeds, and can be noisy.

DISCLOSURE OF INVENTION

The present invention is directed to a motor capable of operating as either an induction motor or as a reluctance-based motor. The motor drive provides more than three different phases and is capable of synthesizing different harmonics. As an example, the motor may be wound with seven different phases, and the drive capably of supplying fundamental, third and fifth harmonic. The stator windings are preferably connected with a mesh connection. The system is particularly suitable for a high phase order induction machine drive systems of the type disclosed in U.S. Pat. Nos. 6,657,334 and 6,831,430.

The stator may be wound with any even number of poles. In addition, the invention does not limit to any particular ratio of inverter output legs to stator winding phases.

The rotor, in combination with the stator, is designed with a particular structure that reacts to a magnetic field configuration generated by one drive waveform harmonic. The reaction to this harmonic by the rotor structure produces a reluctance torque that rotates the rotor. For a different harmonic drive waveform, a different magnetic field configuration is produced, for which the rotor structure defines that substantially negligible reluctance torque is produced. However, this magnetic field configuration induces substantial rotor currents in the rotor windings, and the interaction produces induction based torque to rotate the rotor.

In one embodiment of the present invention, the rotor is structured to produce a substantial reluctance torque under operation of a first harmonic, and a negligible reluctance torque under operation of another harmonic. The harmonic that provides substantial reluctance torque is used to cause the motor to operate based on the reluctance principle, and a harmonic that provides negligible reluctance torque is used to drive the motor as an induction motor.

In a further embodiment, the induction machine rotor and stator each has a different high number of very small teeth. Magnetic poles are established to rotate the rotor. 'Interference', or 'correlation' between the stator and rotor teeth will tend to follow the magnetic poles, causing the rotor to move much more slowly than the magnetic poles.

In a further embodiment, the difference between the number of stator teeth and the number of rotor teeth is equal to half of the pole count of the developed magnetic field used to drive the rotor due to reluctance.

In a further embodiment, the rotor is designed with a number of salient poles or flux guides that produces substantial reluctance torque under the operation of a magnetic field of a certain pole count, but produces negligible reluctance torque, and substantial inductance-based torque, under the operation of a second magnetic field with a second pole count.

The two magnetic fields are set up in a stator, having more than three different phases per pole. For the present invention, it is necessary to use two different harmonics that develop a different number of poles to one another.

In one embodiment, both of the harmonics used are low order harmonics, for example 1-6. These generate relatively low order pole counts which have a larger pole area than high order pole counts, and are thus more efficient. In one embodiment, one of the harmonic orders used is the first harmonic, the fundamental. In a further embodiment, one of the harmonic orders used is the fundamental and the other is the second or third harmonic. In a further embodiment, blends of Type A harmonic orders are used instead of a single harmonic order, for the reluctance effect.

In general the inductance effect and the reluctance effect are not envisioned as being used at the same time. Each is to be used as an entirely different operating mode. The reluctance effect is preferably used for low speed operation, and the inductance effect for high speed operation. For a transition between the two, it is possible to separately generate two different harmonics. The rotor may be structured so that when driven by the harmonic producing the reluctance effect, the rotor rotates in the reverse direction to the rotating stator magnetic field. In order to enable the rotation of such a rotor to be in the same direction for both effects, the harmonic that produces one of the effects can be synthesized to cause magnetic field rotation in the opposite direction to the other harmonic. For example, the harmonic used to produce the reluctance effect is supplied to the stator windings in reverse phase order. Alternatively, the harmonic used to produce one of the effects could be a harmonic that produces a magnetic field that rotates in the reverse direction, such as the fifth harmonic in a 3-phase machine. However, a rotor could also be structured that rotates in the same direction as the rotating magnetic field. This is preferred, for one reason because any harmonic will generate for the rotor some level of inductance based torque, and it is preferable that this will be in the same direction to rotation.

In a further embodiment, the stator windings are connected mesh. The span of the mesh is chosen according to the envisioned usage of the machine, since the span has an effect on the inductance of the machine when different harmonics are synthesized.

In a further embodiment, the stator windings are wrapped in a toroidal fashion around the stator.

In a further embodiment, the number of driven phases is half the number of slots. In a further embodiment, the number of driven phases is half the number of slots, and each driven phase is distributed amongst two adjacent slots. In a further embodiment the number of driven phases is equal to the number of slots. In a further embodiment, the number of driven phases is equal to the number of slots, and each driven phase is distributed amongst two adjacent slots.

In a further embodiment, a polyphase motor includes a) a drive unit to synthesize N phases of alternating current, where N is more than three per 180 degrees; and to select between applying a Type A and a Type B harmonic drive waveform for the N phases. The Type A and Type B harmonic drive waveforms each include at least one harmonic order that the other does not comprise. The polyphase motor also includes a stator and a rotor, in which the stator has N stator winding phases, driven by the drive unit; and the stator and rotor have profiles suited to produce substantial reluctance based rotor rotation when the Type A harmonic drive waveform is applied. The rotor has windings, suited for producing substantial inductance based rotor rotation when the Type B harmonic drive waveform is applied.

In a further embodiment, the invention describes a method for operating a motor capable of both inductance based and reluctance based operation. The method includes: providing a stator and rotor structure suitable for use as an induction motor, having both windings and a reluctance profile; supplying more than three different phases of alternating current to said stator, to rotate said rotor; and providing a selection of the following operational modes:

(i) supplying the alternating current to provide a stator magnetic field that produces a stator magnetic field matching the reluctance profile, and operable to rotate the rotor due to the reluctance effect, (ii) supplying the alternating current to provide a stator magnetic field that is substantially inoperable to rotate the rotor due to the reluctance effect yet is operable to rotate the rotor due to the induction effect.

Technical advantages of the present invention include: allowing a motor to operate with efficient parameters both at high and at low speeds, opening the market to a new motor type, allowing the motor to be wound with a star connection, reducing operating costs and simplifying logistics.

BRIEF DESCRIPTION OF DRAWINGS

For a more complete explanation of the present invention and the technical advantages thereof, reference is now made to the following description and the accompanying drawings, in which.

BEST MODE FOR CARRYING OUT THE INVENTION

The present invention combines the benefits of a high phase order induction operation and reluctance-based operation into a single machine.

Figure 1:
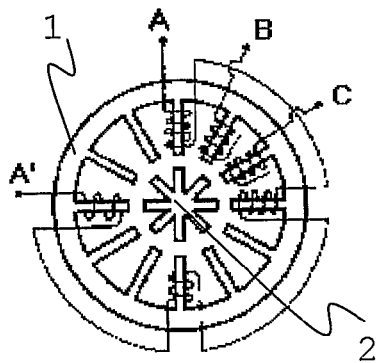
FIG. 1 shows a prior art switched reluctance motor.
Figure 2:
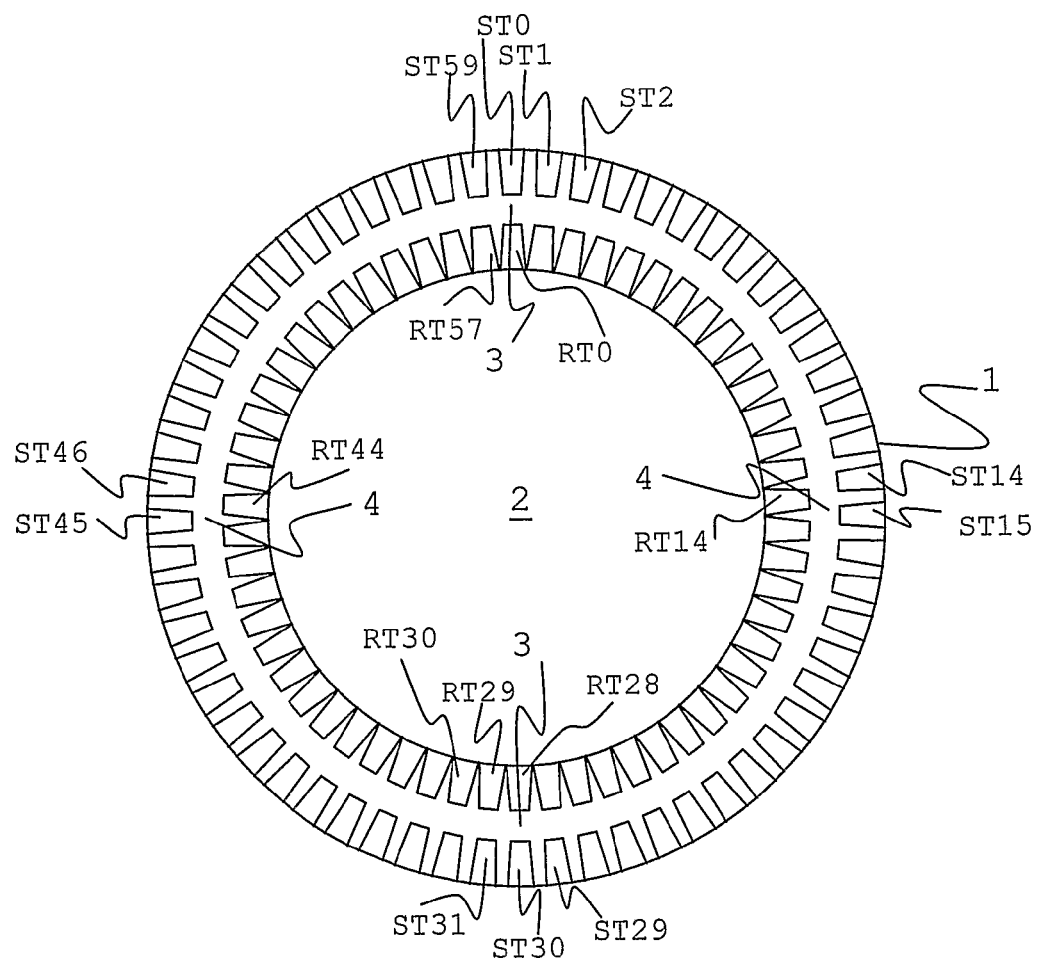
FIG. 2 shows a rotor and stator of the present invention.

One embodiment of the present invention is shown in FIG. 2. Stator 1 and rotor 2 each have a high but different number of teeth. The size, dimensions, and spacing of the teeth are intended for purposes of illustration, and are not intended to replicate reality. As may be seen on the diagram Rotor 2 has 58 teeth RT0-RT57, and stator 1 has 60 teeth, ST0-ST59. Only some of the teeth are labeled, for clarity. Both rotor 2 and stator 1 have windings that are standard for induction machines—these are not shown on the diagram, for clarity. There are 60 slots between stator teeth, each containing a different winding phase. The back sides of each winding are wrapped around the outside of the stator, in a toroidal fashion, as described above. Software suitable for both operations, such as, but not limited to, PWM control is used to provide electrical current to stator windings.

Drive means synthesizes N phases per pole of electrical current for the windings of stator 1. In this example, N equals 30, and the drive means consists of 60 inverter outputs, each winding of each pole being separately energized. 30 inverter outputs would have sufficed if the windings of the same phase in opposite poles would have been connected together (in reverse), as is common in two pole machines. Yet in the current example, each winding is separately driven, to allow second harmonic to be able to be used as a drive waveform.

The drive waveform in the stator winding phases produces a rotating magnetic field. Rotor 2 becomes magnetized by the rotating magnetic field produced by the windings of stator 1. The magnetic field has points of maximum magnetic field strength. The number of such points is usually equal to the number of poles, and the points of maximum magnetic field strength are usually the center of each pole. The number of poles of a magnetic field depends on the base pole count, the number of winding phases and the harmonic order of the drive waveform. Each pole of the magnetic field has a strongly magnetic center and surrounding regions where the magnetic field is gradually weaker. The angular distance between pole centers is equal to 360/P, where P is the number of poles. The angular distance between pole centers represents the entry and exit points of a flux path on the rotor circumference.

The difference between the number of stator and rotor teeth serves to produce a reluctance profile. The reluctance profile is the map of magnetic reluctance versus position in the air gap for a given combination of rotor and stator. The reluctance profile will rotate relative to the stator as the rotor rotates.

When the reluctance profile matches the symmetry of the magnetic field, the reluctance profile causes rotor 2 to align itself with the magnetic field. A tendency exists for rotor 2 to align as much magnetic material as possible along the flux lines between poles. As mentioned above, this usually causes the rotor to rotate, and is known as reluctance torque. The rotor will only have this alignment tendency if there exist for the rotor rotational positions in which more magnetic material is aligned along the flux path and other positions in which less magnetic material is aligned along the flux path. In such cases, the rotor will move from a position in which less magnetic material is aligned along the flux path, to a position in which more magnetic material is aligned along the flux path. However, in some cases, the reluctance profile of the machine is such that there are no positions in which more magnetic material can be arranged along a flux path. For example, for a purely cylindrical solid rotor, the rotor will not have a tendency to rotate due to reluctance torque, since all positions are magnetically equal. Similarly, if the machine contains a reluctance profile that has an entry point and an exit point in the rotor circumference that are angularly spaced differently to the angular distance between pole centers, the rotor may not produce much, if any, reluctance torque.

In the present example, the rotor contains one reluctance pathway that stretches across the rotor, over 180 rotational degrees (D). With the rotor positioning shown in the diagram, rotor teeth RT0 and RT29 directly facing stator teeth ST0 and ST29 depict the reluctance pathway for the machine. The alignment tendency of the rotor will only exist for this machine if the rotating magnetic field includes poles of opposite polarity 180 D apart.

A reluctance profile for a rotor and stator can be said to consist of rotor regions with low reluctance 3 and rotor regions with high reluctance 4. In the present example, rotor regions with low reluctance 3 are where the center of a rotor tooth directly aligns with the center of a stator tooth. Rotor regions with high reluctance 4 are where the center of a rotor tooth directly aligns with the center of stator slot, between stator teeth. In this example, there are low reluctance regions 3 and high reluctance regions 4. A tendency exists for the low reluctance regions 3 of rotor 2, that is, the aligned teeth, to draw as close as possible to magnetic poles produced by stator 1. The non-aligned teeth are left facing points of minimum magnetic field strength.

The effect of reluctance stems from the tendency of iron or steel to line up along a flux path between two magnetic poles. The 'reluctance' of a magnetic path depends upon the material in that path. The lower the reluctance of the magnetic path, the lower the energy of the system. In a system containing both air and steel, magnetic flux through steel represents a lower energy state than magnetic flux through air.

Iron filings sprinkled within a magnetic field will twist on their axes until they are each aligned with the magnetic field. Similarly, a rotor with iron projections into an air gap, subjected to a magnetic field, will rotate to align as much iron as possible with the magnetic flux, and effectively reducing the volume of air in the region.

In any reluctance motor, a rotor is arranged in such a way that different rotor positions give different reluctances to magnetic paths produced by the stator coils. With any given stator coil energized, the magnetic path will favor a rotor to be in a particular position. So as different stator coils are energized in turn, the rotor will have to move in order to maintain the lowest reluctance magnetic path for the changing magnetic fields.

As mentioned, the machine shown in FIG. 2 does not have salient poles for the rotor or stator, but rather, stator 1 and rotor 2 each have teeth, with a different tooth count. For this type of machine, a position of high reluctance is not produced by the rotor teeth facing the positions of the magnetic poles. Instead, a high reluctance for the machine is produced when the rotor and stator teeth align with one another. When flux paths are created in the machine by a magnetic field, the rotor will tend to align rotor teeth with stator teeth particularly at an entry point and an exit point for the flux path on the rotor circumference. A position of low reluctance is where the stator and rotor teeth are not aligned with one another. The rotor has a tendency to assume non-aligned stator and rotor teeth in regions halfway between magnetic poles.

In the machine under discussion, the regions of low reluctance, where the stator and rotor teeth align quite well, could be compared to the long sides of the iron filings, and the regions of high reluctance, where the rotor teeth align with stator slots could be compared to the short sides of the iron filings.

In order to use this machine for reluctance-based operation, the windings of stator 1 are provided with electrical drive to produce a two-pole field. In other words, the machine is wound with a base pole count of two, and supplied with fundamental drive waveform current. A two-pole field is chosen to match the symmetry of the motor reluctance profile, since the combination of stator 1 and rotor 2 produces two regions of low reluctance, 180 D apart, as mentioned above, and a two-pole field similarly contains poles of opposite polarity 180 D apart. If preferred, a six or ten pole field also contain poles of opposite polarity 180 degrees apart, and third or fifth harmonic drive waveform could be used to generate these magnetic fields. However, the extra poles that these fields contain could detract from the effectiveness of the reluctance torque produced.

Figure 3A:
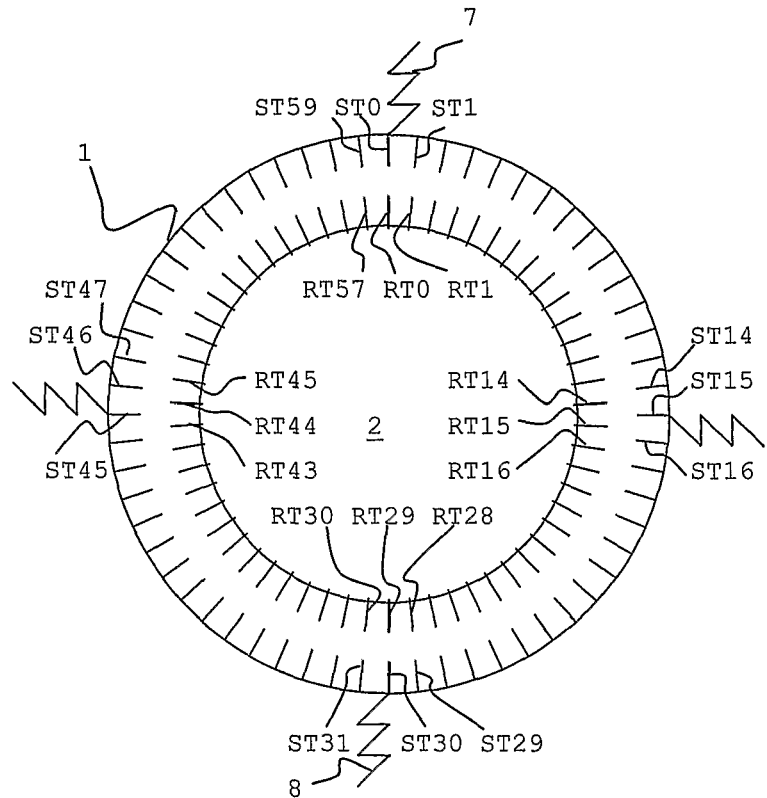
FIGS. 3a-3c show a rotor and stator of the present invention in operation.
Figure 3B:
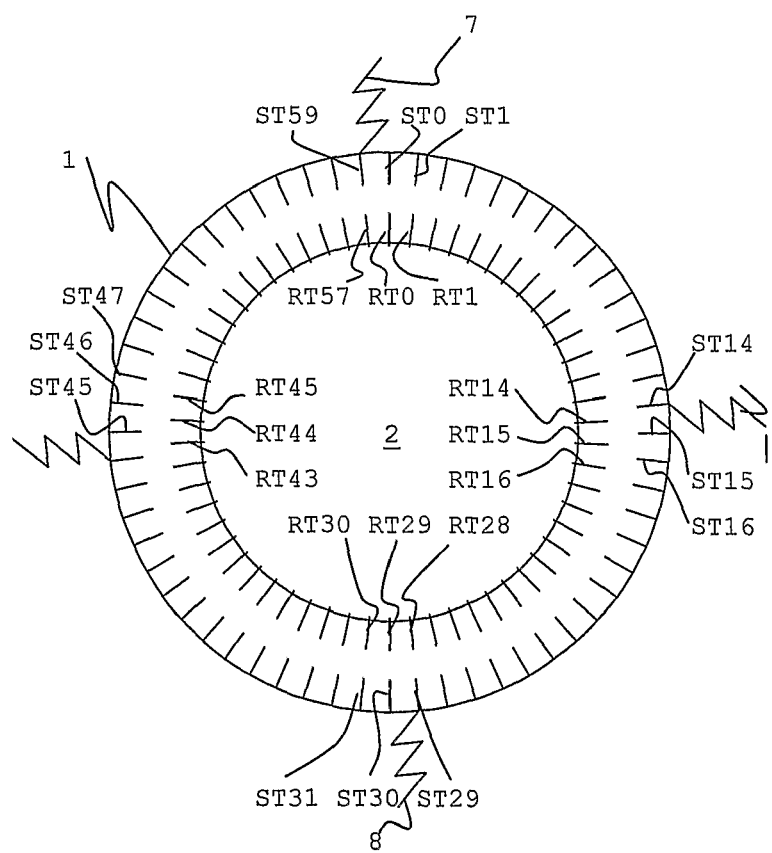

With reference now to FIGS. 3a and 3b, operation of the motor is shown in two stages. The motor is identical to that of FIG. 2, with lines representing teeth. With reference to FIG. 3a, at a first instant, stator tooth ST0 has a maximum north polarity 7, and stator tooth ST30 has a maximum south polarity 8. A magnetic flux path thus exists directly between these two teeth. Rotor 2 does not move, since rotor teeth RT0 and RT29 are already directly aligned with these two stator teeth. Thus low reluctance regions 3 are already aligned with the flux path. With reference to FIG. 3b, at a second instant, the magnetic field has been rotated anticlockwise by 6 degrees. Now stator tooth ST59 has a maximum north polarity 7, and stator tooth ST29 has a maximum south polarity 8. The closest rotor teeth to the new flux pathway are rotor teeth RT57 and RT28, which move clockwise to align themselves directly with stator teeth ST59 and ST29 respectively. The rotor thus moves 0.21 degrees clockwise to align itself. The process continues as the magnetic field continues to rotate. When the magnetic flux moves 'one stator tooth', the point of alignment moves to the next stator tooth, and the total rotation of the rotor is caused by the difference in number of teeth.

For the movement of the magnetic flux by one stator tooth, the rotor rotation equals $(360°/X)-(360°/Y)$ where X is the number of stator teeth and Y is the number of rotor teeth. This is multiplied by the number of teeth that the flux moves through over a pole pair.

Also, assuming that X and Y are each higher than the difference between X and Y, the number of regions of low reluctance is equal to the difference between X and Y. The number of regions of low reluctance, R, should be equal to or a multiple of, the number of magnetic poles in the magnetic field used to produce the reluctance effect. These formulae would be modified if the stator and rotor teeth were not the same size as one another, or had different spacing.

In order to use the machine for induction-based operation, a magnetic field is used to produce flux paths that do not match the symmetry of the reluctance profile of the machine. This means that for the magnetic field, there are substantially no positions that the rotor could assume which would increase or decrease the amount of magnetic material in the flux path. For example, a drive waveform is provided consisting of second harmonic. This creates four magnetic poles for the machine with a flux path at the rotor circumference over approximately 90 RD. In a 4-pole machine, the flux path within the rotor is such that magnetic flux does not travel a diametrical route across the rotor but curves towards adjacent magnetic poles.

Figure 3C:
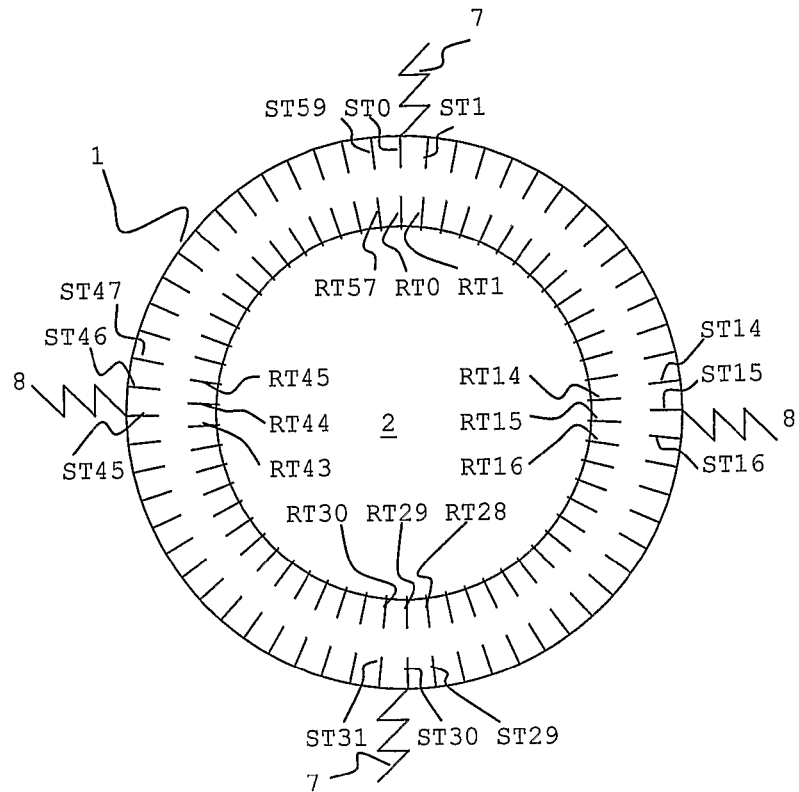

With reference now to FIG. 3c, a four pole magnetic field is now applied to the stator windings. Stator teeth ST0 and ST30 are given a maximum north polarity 7, and the stator teeth ST15 and ST45 are given a maximum south polarity 8. Thus two low reluctance regions exist, one from ST0 to ST15, and one from ST30 to ST45. As mentioned, a low reluctance for the machine is produced when the rotor and stator teeth align with one another along the flux path. That is, for both an entry point and an exit point for the flux path on the rotor circumference, the stator and rotor teeth are aligned. However, as can be seen on the diagram, the reluctance profile of the machine does not match the 90 D flux paths. The rotor cannot align rotor teeth with stator teeth at two positions 90 D apart. This is because high reluctance regions 4 exist between rotor tooth RT43 and RT44 and stator teeth ST45, and between rotor teeth RT14 and RT15 and stator tooth ST15, while low reluctance regions 3 exist between RT0 and ST0, and between RT29 and ST30. For rotor 2, there is no low reluctance pathway that leads across 90 RD. If rotor 2 would rotate by 3 D in either direction, to align tooth RT43 or RT44 with ST45, at the same time tooth RT0 would become unaligned with tooth ST0, preventing a reluctance path from following a flux path. It can be seen that for any degree of rotation of rotor 2, there is not much difference in the amount of rotor magnetic material that would lie within the flux path. If the teeth themselves are wide enough, rotor 2 would probably rotate a little. Reluctance torque for the second harmonic drive waveform in this machine is thus very weak, if extant.

When the magnetic field produces flux paths that do not match the machine reluctance profile, as described, the induction-based aspect of the machine rotates the rotor. With the four pole field produced by the second harmonic drive waveform as described, the rotor turns because of the interaction between stator currents and induced rotor currents.

In the present invention, an induction machine is designed to produce a number of different 'reluctances' to rotor magnetic pathways produced by the various magnetic pole counts. The stator is constructed with a number of teeth, and the rotor is provided with a different number of teeth. The rotor has windings, enabling it to operate as an induction machine. The number and size of the stator and rotor teeth, or the entire stator and rotor profiles, are chosen to enable the rotor to be driven by reluctance torque when the motor phases are driven with a particular harmonic or combination of harmonics. In addition, the rotor is enabled to run as a regular induction motor when driven with a different harmonic—a harmonic that doesn't substantially produce reluctance torque in the rotor. The rotor windings could be a standard squirrel cage winding commonly used by induction machines, or could be a more specialized winding that does not react with the harmonic producing the reluctance effect.

In the present invention, two properties of harmonics are delineated. Type A harmonics are able to produce a magnetic field that matches the symmetry of the reluctance profile of the stator-rotor combination. These cause the rotor to rotate due to reluctance torque. A Type A harmonic could constitute one harmonic, or a combination of harmonics which together produce reluctance torque in the rotor. Type B harmonics are those that do not produce a significant amount of reluctance-based torque in the rotor. Type B harmonics are used in the present invention to cause the rotor to rotate due to induction of currents in the rotor and the subsequent interaction of stator and rotor magnetic fields. Thus when choosing which Type B harmonic to use, it is recommended to use one that efficiently uses the supplied electrical current to induce substantial current in the rotor.

As mentioned, if the number of low reluctance regions is equal to, or a multiple of, the number of magnetic poles developed in the machine by a harmonic, the harmonic is said to be Type A. For harmonics below the phase count, Type A harmonics are the integer values of H for which H=R/(M*k), where H is the harmonic order, R is the number of low reluctance regions, M is the base magnetic field and k is the set of all real positive integers. For harmonics above the phase count, Type A harmonics can be identified after considering the actual number of poles that are developed in the machine by the aliased harmonic.

Type B harmonics may be considered as the class of all harmonics that are not Type A. However, sometimes the specific reluctance profile of a machine may cause some Type B harmonics to produce an unacceptably high degree of cogging torque. This might be the case, for example, when the Type A and Type B harmonic have a similar, high number of poles, or where there is a low ratio of teeth to poles. Where possible, a Type B harmonic with substantially low cogging torque would be preferred.

Some harmonics may fall into both categories, and some into neither category. For example, all harmonics in which the rotor conductors are not synchronous with the magnetic field, will produce some degree of inductance based torque. In addition, if the stator and rotor profiles are designed to maximize reluctance torque, it is possible that the Type B harmonic will also produce a certain degree of undesirable reluctance torque. However, for each motor configuration and application, at least one Type A harmonic and at least one Type B harmonic may each be identified, in which the Type A harmonic produces a substantial degree of reluctance torque, and the Type B harmonic produces a substantially low degree of reluctance torque, preferably negligible. The identified most powerful and practical harmonics are used by the software to respectively produce the reluctance and inductance effect in the motor.

The two types of harmonics and their effects are not usually applied simultaneously, and it is preferred that the induction effect is used to produce rotor torque at high speeds while the reluctance effect is used to produce rotor torque at low speeds.

Preferably, for high speed operation, a Type B harmonic provides drive. The stator magnetic field induces current in the rotor, and the stator and rotor magnetic fields interact and cause the rotor to rotate. For low speed operation, a Type A harmonic is used as the drive waveform. The stator magnetic field produces reluctance-based torque in the rotor. Either reluctance or inductance torque may be used at startup, depending upon the torque requirements of the load.

There are also other ways to produce these different reluctance pathways. The simplest, perhaps, is to have a rotor with some small number of salient poles. The salient poles will need to line up with the source poles to minimize the reluctance of the magnetic path. The stator may be smooth or toothed. SR machines commonly use this principle, and use the reluctance effect with discrete stator poles as magnetic field source, and discrete rotor poles pairs effecting rotor rotation. It is common practice for the number of rotor and stator projections to be different. However, it is acceptable that they are equal for a generator or a specialized application. Typically the number of stator projections is greater by two than the number of rotor projections, but other combinations are possible. The number of stator projections is usually an integral multiple of the number of phases.

In the present invention, the rotor is optimized for both reluctance and inductance. Therefore it is preferred if the stator is very uniform for the induction motor windings. It is preferred if the stator either has small teeth (stepping), or a smooth stator with a shaped rotor, meaning parts cut away, leaving projections, from the perfectly cylindrical rotor shape. Another preferable embodiment is that the rotor has teeth that are equidistant all the way around the circumference, and provides reluctance only in combination to a differently-toothed stator.

Stator windings take the form of induction machine windings. There are many acceptable ways in which the machine could be wound. In one embodiment, the machine is wound with a full pitch, concentrated winding.

In a further embodiment, the stator is wound with a short pitch winding, for example, 120 rotational degrees (RD) on the stator. The pitch of the stator winding is chosen to allow the harmonics that it is desired to use for the inductance and reluctance effects. For example, if it is desired to use first harmonic for one effect and second harmonic for the other effect, a pitch of 120 D may be used. If it desired to use second and third harmonic for the two effects, and pitch of 150 D may be used. Short pitched windings enable the use of even order harmonics. In a further embodiment, the stator is wound in a toroidal fashion, as described above.

If it is not required to use even order harmonics, each phase winding may be wound many times down axially along the stator, radially crossing the stator at both ends. In one embodiment, the stator is wound with a concentrated winding. For the induction effect, the iron stator teeth serve to increase the magnetic flux produced in the airgap by the copper windings, and smoothen the magnetic field.

Figure 4:
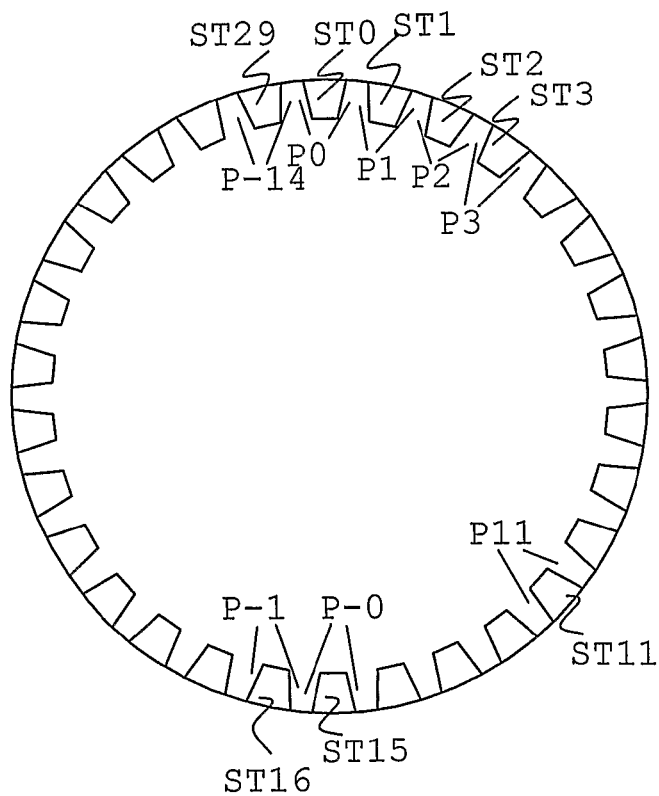
FIG. 4 shows a suggested phase winding arrangement of one embodiment of the present invention.

In a further embodiment, each phase winding is distributed over two adjacent slots per pole. Referring now to FIG. 4, each stator winding phase is distributed across two adjacent slots. Stator 1 has thirty teeth (ST0-ST29). Fifteen phases are wound on the stator, including drive sides (P0 to P14) and back sides (P-0 to P-14). Each side of each phase is wound in two adjacent slots, so that two halves of the drive side Phase P0 are on either side of Tooth ST0, while the two halves of the back side of the same phase, P-0, are on either side of Tooth ST14. Two halves of the drive side Phase P1 are on either side of Tooth ST1, with the back sides of the same phase are on either side of Tooth ST15. The two halves of drive side Phase P2 are on either side of Tooth ST2. The two halves of the drive side Phase P11 are on either side of Tooth ST11. Many teeth and phases have not been labeled for clarity, yet they follow the same distribution. Due to each end of each phase being distributed across two slots, the magnetic field produced by the phase is accentuated by the iron tooth in the center of each phase winding. This may strengthen the maximum of the magnetic poles and reduce the magnetic flux of the surrounding regions, which may be beneficial for the reluctance effect.

In an alternative embodiment, the windings of each phase may be distributed amongst several slots, and preferably center around a tooth as opposed to a slot. For example, amongst four adjacent slots, one phase may be distributed to have 50, 100, 100, and 50 windings in the respective slots.

A further way to strengthen the reluctance effect is by profiling the curve of the supplied current. Another way to strengthen the reluctance effect is by distributing the windings according to a filter that concentrates the flux. A further way to strengthen the reluctance effect is to have a high number of poles, either by using a high base pole count, or by using a high order harmonic. For example, in a fifteen phase machine, the thirteenth harmonic may be used for the reluctance effect, and a lower order harmonic for the inductance effect. A further way to strengthen the reluctance effect is by energizing at a large subset of windings to be at full current.

The magnetic flux density B is analogous, in the magnetic circuit, of the current density in an electric circuit. In the magnetic circuit the magnetic equivalent to current is the total flux symbolized by the Greek letter phi, $\Phi$, given by BA, where A is the cross-sectional area of the magnetic circuit. In an electric circuit the electromotive force (E) is related to the current, i, in the circuit by E=ri, where r is the resistance of the circuit. In the magnetic circuit F=T$\Phi$, where T is the reluctance of the magnetic circuit and is analogous to resistance in the electric circuit. Reluctance is obtained by dividing the length of the magnetic path l by the permeability times the cross-sectional area A; thus r=l/$\mu$A, where $\mu$ symbolizes the permeability of the medium forming the magnetic circuit. The units of reluctance are ampere-turns per weber. These concepts can be employed to calculate the reluctance of a magnetic circuit and thus the current required through a coil to force the desired flux through this circuit.

Several problems common to reluctance machines can be mitigated by the used of the present invention. For example, even with the same number of teeth, the machine may be self starting due to being operable as an induction machine. Secondly, noise may be reduced by a high phase count, reducing sympathetic vibrations otherwise caused by powerful low-order harmonics.

Various stator and rotor structures common to SR motor techniques and stepper motors may be used with the present invention. The invention requires a stator and a rotor each comprising conductors, making the structure operable as an induction motor. In addition, the invention requires that the stator and motor in combination have a reluctance profile which, under the operation of a matching harmonic, would cause the rotor to rotate due to the reluctance effect. In addition, the invention requires that the stator and motor in combination have a reluctance profile which, under the operation of a non-matching harmonic, would cause the rotor to substantially not rotate due to the reluctance effect. Various profiles of rotors and stators would fit this description. For example, a common profile used by hybrid stepping motors consists of eight stator projections, each having five teeth. The rotor has 50 teeth. The rotor teeth have the same pitch as the teeth on the stator projections and are offset so that the centerline of a tooth at one end coincides with a slot at the other.

In the present disclosure, the stator has been described as having teeth all the way around its circumference. However, it is also possible to design the stator with toothless regions. In addition, it has been assumed that the windings are spaced continuously around the stator. However, it is also possible that as long as they are phased appropriately and sufficiently rotationally symmetrical, that there are regions without windings.

In a preferred embodiment the system of the invention is implemented as follows: A stator and a rotor are built with a high number of teeth (greater than 30) with the difference between the number of stator and rotor teeth being two. The rotor is wound with five or more phases. Fundamental, or first harmonic, is used to provide reluctance torque. Third harmonic is used to drive the motor as an induction machine, for startup and high rotor output speeds.

Figure 5:
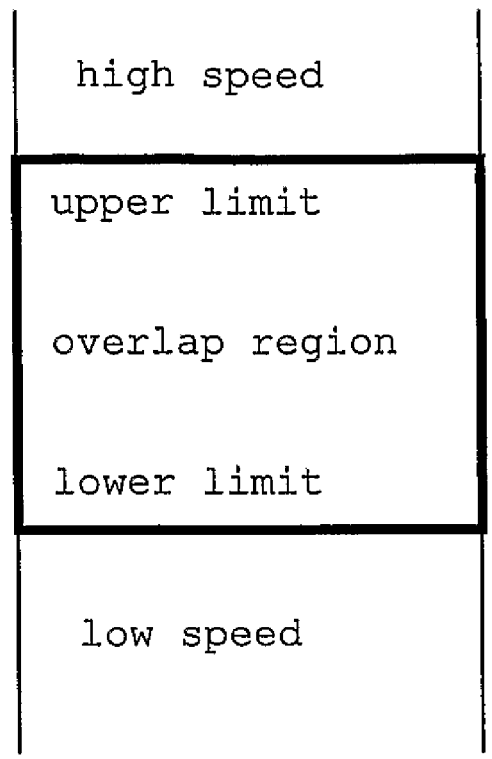
FIG. 5 shows a suggested switching mode of one embodiment of the present invention.

In one embodiment, the drive system has predetermined speed requirement thresholds causing it to switch electronically between induction and reluctance based drive operational modes. In a further embodiment, it is preferred to not fluctuate excessively between the two modes. One common method used in various control systems, based on hysteresis, is shown in FIG. 5. An overlap speed region is provided between "high speed" operational mode and "low speed" operational mode. The motor does not change modes until the more distant overlap limit is reached. For example, the reluctance effect and its associated drive harmonics and range of voltages is used as operational mode (i) for low speed operation, while the inductance effect, and its associated drive harmonics and range of voltages is used as operational mode (ii), for high speed operation. A control unit has a user input for registering updated speed requirements. The control unit determines which operational mode is to be used, and which voltages and frequency should be synthesized by the drive. When operating in operational mode (i) and a speed increase is required, the control unit would not switch to operational mode (ii) until an upper limit of an overlap speed region is required. Similarly, when operating in operational mode (ii) and a speed decrease is required, the control unit only switches to operational mode (i) when a lower limit of an overlap speed region is required. This method should substantially preventing cycling between operational modes. Other methods of preventing the motor from cycling between operational modes, as well as methods for using inertia to advantage are possible, and anticipated.

Technicalities of motor construction are well known in the art. High quality steel is recommended. In one embodiment, some or all of the conducting regions are formed of the alloy Hiperco. For the inductance effect, heavy iron saturation may be seen as a benefit, yet as iron saturates, its reluctance get higher and higher. Thus, high saturation can actually reduce the torque produced by the reluctance effect.

A large air gap, over 0.025", such as 0.03-0.04" can help improve mechanical tolerances and reduce contamination, bearing wear, and shaft vibration. An "inside out" or a linear motor design are possible. A recommended rotor length of between 0.5 to twice the diameter is preferable.

It is often the case in SR machines and in stepper motors that the rotor has teeth or poles spaced further apart than the stator teeth or poles. Amongst other things, this ensures that there is only one direction in which the rotor teeth can be attracted to move. The result of this is often that the rotor rotates in the reverse direction to the direction of the stator magnetic field rotation. In contrast, in an induction machine, the stator and rotor fields always rotate in the same direction as each other, assuming the phase count is higher than the order of the harmonic drive waveform.

In the present invention, it is preferable to be able to just switch harmonics in order to effect a change between induction machine operation and reluctance machine operation.

However, in some cases, one would have to also reverse the order of all the stator phases, to prevent the rotor from rotating in the reverse direction.

In the present invention it is anticipated that the rotor need not have fewer teeth than the stator. The rotor and stator should have different numbers of teeth, to provide the reluctance profile mentioned above. The stator may have fewer teeth than the rotor, or the rotor may have fewer teeth. Also the rotor and stator may have different teeth dimensions from one another, instead of or as well as different numbers of teeth. In some build types, the reluctance effect may cause the rotor to rotate in the same direction as the magnetic field rotation. If the rotor has fewer teeth than the stator by the appropriate ratio, then when the magnetic field moves 'forward' by a large amount, the rotor will also move 'forward' by a small amount, to keep the correct teeth aligned. As the magnetic field moves, the region of minimum reluctance must also move, causing the rotor to move. Depending upon the ratio and size of rotor to stator teeth, this could be a forward or reverse direction rotor motion.

If however, a motor has a design that causes the rotor to rotate in the reverse direction to the rotating magnetic field, then in order to ensure that rotor rotational direction is in the same direction for both the induction and reluctance effect, one of the harmonics may be fed to the coils in reverse phase order. It is trivially easy to reverse an inverter fed induction motor, simply by changing the phase angles fed to the coils; reversing the order at the logic level in the inverter.

During the moment of switching between effects, it may be desirable to have an overlap period, during which both harmonics are run at once, to ease transition. If the motion due to the reluctance effect is in the reverse direction of the motion due to the induction effect, various possibilities exist. For example:

A) A harmonic supplied in a forward rotation around the stator is used for one effect. A harmonic supplied in reverse rotation is used for the other effect. These are combined together during the overlap period. This combination requires more mathematics to synthesize and are thus quite complex to synthesize, and might reduce the inverter output voltage capability. Nevertheless, this design remains fully functional.

B) A harmonic drive waveform chosen for the reluctance effect is deliberately chosen as a particular harmonic order that is higher than the phase count that aliases to a reversed direction magnetic field. The magnetic field produced will have a lower number of poles than M*H, and will rotate in the reverse direction to the order in which the windings are supplied with phased current. An example of this is a 5-phase machine in which third harmonic is used for the induction effect and seventh harmonic is used for the reluctance effect. In a 5-phase machine, seventh harmonic produces a reverse direction 2-pole field. When using an alias reversed harmonic for one effect, the harmonics for both effects can each be supplied to the driven coils in the same phase order.

It should be noted that harmonics above the phase count that alias to a lower pole count, cannot be used in the present invention to produce reluctance torque—if the harmonic that produces that lower pole count without aliasing is to be used to produce the inductance effect, and vice-versa, since they both produce the same magnetic field structure.

However, it is preferred to generally design the machine that the rotations are in the same direction for all effects.

In a preferred embodiment, both of the harmonics used are low order harmonics, for example 1-6. These generate relatively low order pole counts which have a larger pole area than high order pole counts, and are thus generally more efficient.

In one embodiment, one of the harmonic orders used is the first harmonic, the fundamental. In a further embodiment, one of the harmonic orders used is the fundamental and the other is the second or third harmonic. In a further embodiment, blends of Type A harmonic orders are used instead of a single harmonic order, for the reluctance effect.

INDUSTRIAL APPLICABILITY

The present invention is aimed at all current multi-speed motor markets, having the joint benefits of both SR and induction motors. The motor can operate in hostile, extreme, and sensitive environments. Typical applications include pumps, high speed compressors, fuel cells, traction drives, and appliances. The motor is expected to be of relatively small dimensions, lightweight, durable, rugged and inexpensive.

The invention claimed is:

1. A polyphase motor comprising:
   a) a drive unit operable to:
      i) synthesize N phases of alternating current where N is more than three per 180 degrees; and
      ii) select between applying a Type A and a Type B harmonic drive waveform for said N phases, wherein said Type A and Type B harmonic drive waveforms each comprise at least one harmonic order that the other does not comprise; and
   b) a stator and a rotor, comprising:
      i) N stator winding phases, driven by said drive unit; and
      ii) profiles of said stator and rotor, suited to produce substantial reluctance based rotor rotation when a Type A harmonic drive waveform is applied; and
      iii) rotor windings, suited for producing substantial inductance based rotor rotation when a Type B harmonic drive waveform is applied.

2. The polyphase motor of claim 1 wherein a difference between a number of stator teeth and a number of rotor teeth is equal to half of the pole count of the developed magnetic field used to drive the rotor due to reluctance.

3. The motor of claim 1 wherein a number of stator teeth and a number of rotor teeth have different values, each 30 or more.

4. The motor of claim 1 wherein said stator comprises teeth equidistant around the circumference.

5. The motor of claim 1 wherein said rotor comprises teeth equidistant around the circumference.

6. The motor of claim 1 wherein said Type A harmonic drive waveform is associated with low speed operation, and wherein said Type B harmonic drive waveform is associated with high speed operation.

7. The motor of claim 1 wherein said stator windings are arranged to allow second harmonic to drive the machine, and wherein said Type A harmonic drive waveform comprises fundamental and said Type B harmonic comprises second harmonic.

8. The polyphase motor of claim 1 wherein said profiles of said stator and rotor are suited to produce substantially little cogging torque when said Type B harmonic drive waveform is applied.

9. The motor of claim 1 wherein said stator and rotor profiles serve to produce substantial reluctance based rotor rotation in the same direction to the rotating magnetic field developed by said Type A harmonic drive waveform.

10. The motor of claim 1 wherein said stator and rotor profiles serve to produce substantial reluctance based rotor rotation in the reverse direction to the rotating magnetic field developed by said Type A harmonic drive waveform, and wherein said drive unit further operable to apply said Type A harmonic drive waveform to said stator winding phases in reverse phase order to the application of said Type B harmonic to said stator winding phases.

11. The motor of claim 1 wherein profiles of said stator and rotor profile serve to produce substantial reluctance based rotor rotation in the reverse direction to the rotating magnetic field developed by said Type A harmonic drive waveform, and wherein said Type A harmonic has a harmonic order higher than the phase count and produces a reverse direction rotating field to the rotating field produced by said Type B harmonic.

12. The motor of claim 1 wherein each of said stator winding phases is concentrated in one slot per wound pole.

13. The motor of claim 1 wherein each of said stator winding phases is distributed over at least two adjacent slots per wound pole.

14. The motor of claim 1 wherein said stator phase windings are mesh connected.

15. The motor of claim 1 wherein said stator phase windings are wound on said stator in a toroidal fashion.

16. A method for operating a single motor as an induction machine and as a reluctance machine, comprising:
   a) providing a stator and rotor comprising windings suitable for use as an induction motor, and comprising a reluctance profile,
   b) supplying more than three different phases of alternating current to said stator, to rotate said rotor,
   c) providing a selection of the following operational modes:
      (i) supplying said alternating current to provide a stator magnetic field that matches the reluctance profile, and operable to rotate the rotor due to the reluctance effect,
      (ii) supplying said alternating current to provide a stator magnetic field that is substantially inoperable to rotate the rotor due to the reluctance effect, yet is operable to rotate the rotor due to the induction effect.

17. The method of claim 16 wherein the reluctance profile of the stator and rotor structure causes the rotor, in operational mode (i), to rotate in the same direction as the rotational direction of the stator magnetic field.

18. The method of claim 16 wherein the reluctance profile of the stator and rotor structure causes the rotor, in operational mode (i), to rotate in the reverse direction from the rotational direction of the stator magnetic field, and wherein operational mode (i) comprise reversing the phase order from operational mode (ii) so that the rotor rotates in the same direction in both modes.

19. The method of claim 16 wherein the reluctance profile of the stator and rotor causes the rotor, in operational mode (i), to rotate in the reverse direction to the rotational direction of the stator magnetic field, and wherein said operational mode (ii) is realized by supplying a harmonic of the type that produces a reverse-direction magnetic field from the magnetic field produced by operational mode (ii), so that the rotor rotates in the same direction in both modes.

20. The method of claim 16 further comprising the step of: starting the motor by using operational mode (i).

21. The method of claim 16 further comprising the step of starting the motor by using operational mode (ii).

22. The method of claim 16 further comprising the step of:
   selecting operational mode (i) when a low speed rotor output is required, and selecting operational mode (ii) when a high speed rotor output is required.

23. The method of claim 22 further comprising the steps of:
   a) when operating in operational mode (i) and a speed increase is required, only selecting operational mode (ii) when an upper limit of an overlap speed region is required, and
   b) when operating in operational mode (ii) and a speed decrease is required, only selecting operational mode (i) when a lower limit of an overlap speed region is required,
   whereby substantially preventing cycling between operational modes.

24. The method of claim 16 further comprising the step of providing a lower order harmonic in operational mode (i) than in operational mode (ii).

25. The motor of claim 24 wherein said rotor comprises a number of low reluctance regions that is equal to, or a multiple of, the number of magnetic poles in the magnetic field developed by said first of said at least two different harmonics.

26. A motor comprising
   a) a drive, for providing alternating current of N different phases per pole, where N is more than three, and for providing a selection of at least two different harmonics,
   b) a stator, comprising N winding phases, and a stator profile,
   c) a rotor, comprising a profile that, in combination with said stator profile, causes rotor rotation due to reluctance when operated by a first of said at least two different harmonics, and causes substantially low cogging torque when operated by a second of said at least two different harmonics; and further comprising windings that enable rotor rotation due to inductance.

27. The motor of claim 26 wherein said first of said at least two different harmonics comprises an integer value of H for which H=R/(M*k), where H is the harmonic order, R is the number of low reluctance regions, M is the base magnetic field and k is the set of all real positive integers.

* * * * *